US012239041B2

(12) United States Patent
Donadon et al.

(10) Patent No.: US 12,239,041 B2
(45) Date of Patent: Mar. 4, 2025

(54) SEEDS DISTRIBUTION DEVICE FOR PRECISION SOWING MACHINES AND PRECISION SOWING MACHINE COMPRISING SUCH A DEVICE

(71) Applicant: Maschio Gaspardo S.p.A., Campodarsego (IT)

(72) Inventors: Gianfranco Donadon, Concordia Sagittaria (IT); Luigi Giovanni Bot, Portogruaro (IT); Bruno Miolo, Concordia Sagittaria (IT)

(73) Assignee: Maschio Gaspardo S.p.A., Campodarsego (IT)

(*) Notice: Subject to any disclaimer, the term of this patent is extended or adjusted under 35 U.S.C. 154(b) by 603 days.

(21) Appl. No.: 16/762,604

(22) PCT Filed: Nov. 9, 2018

(86) PCT No.: PCT/IB2018/058814
§ 371 (c)(1),
(2) Date: May 8, 2020

(87) PCT Pub. No.: WO2019/092645
PCT Pub. Date: May 16, 2019

(65) Prior Publication Data
US 2020/0359558 A1    Nov. 19, 2020

(30) Foreign Application Priority Data
Nov. 10, 2017    (IT) .......................... 102017000128649

(51) Int. Cl.
*A01C 7/04*    (2006.01)
*A01C 7/12*    (2006.01)

(52) U.S. Cl.
CPC ............ *A01C 7/046* (2013.01); *A01C 7/0443* (2023.05); *A01C 7/123* (2013.01); *A01C 7/128* (2013.01)

(58) Field of Classification Search
CPC ........... A01C 7/04; A01C 7/042; A01C 7/044; A01C 7/046; A01C 7/121; A01C 7/123; A01C 7/128; A01C 7/18; A01C 7/0443
See application file for complete search history.

(56) References Cited

U.S. PATENT DOCUMENTS

| 3,608,787 A | 9/1971 | Grataloup |
| 4,469,244 A * | 9/1984 | Maury ................... A01C 7/046 |
| | | 221/211 |

(Continued)

FOREIGN PATENT DOCUMENTS

| DE | 102013100118 | 6/2014 |
| DE | 102015101253 | 7/2016 |

(Continued)

OTHER PUBLICATIONS

International Search Report dated Feb. 22, 2019 issued by the European Patent Office for corresponding International Application No. PCT/IB2018/058814.

(Continued)

*Primary Examiner* — Alicia Torres
(74) *Attorney, Agent, or Firm* — Stradley Ronon Stevens & Young, LLP

(57) ABSTRACT

A seed distribution device for precision sowing machines. The device includes a housing for a seed selector disc which is mounted for rotation about a central rotation axis, at least one ring of holes in the seed selector disc which is provided to transport seeds over a circular trajectory, a first singulator and a second singulator which are mounted so as to be radially facing on the housing at opposite sides of the circular trajectory of the seeds and the first and second (Continued)

singulator being distal and proximal with respect to the central rotation axis, respectively, the first singulator and second singulator defining a disruptive selection path for the seeds and being independently and selectively adjustable to modify at least locally the disruptive path so as to eliminate duplicates of seeds from the disc without creating failures.

19 Claims, 5 Drawing Sheets

(56) References Cited

U.S. PATENT DOCUMENTS

| | | | |
|---|---|---|---|
| 6,516,733 B1* | 2/2003 | Sauder | A01C 21/005 111/180 |
| 6,758,153 B1* | 7/2004 | Hagen | A01C 7/046 221/211 |
| 7,497,175 B2* | 3/2009 | Friestad | A01C 7/046 74/813 L |
| 8,746,159 B2 | 6/2014 | Garner et al. | |
| 9,265,191 B2* | 2/2016 | Sauder | A01C 7/046 |
| 9,578,798 B2* | 2/2017 | Scheideler | A01C 7/20 |
| 10,010,024 B2 | 7/2018 | Pirkenseer et al. | |
| 10,104,832 B2 | 10/2018 | Wilhelmi et al. | |
| 11,678,601 B2* | 6/2023 | Koch | A01C 7/046 111/185 |
| 2003/0183647 A1* | 10/2003 | Ven Huizen | A01C 7/046 221/211 |
| 2008/0110382 A1* | 5/2008 | Brockmeier | A01C 7/046 111/184 |
| 2008/0110383 A1* | 5/2008 | Friestad | A01C 7/046 111/185 |
| 2016/0255768 A1 | 9/2016 | Garner et al. | |
| 2016/0366814 A1* | 12/2016 | Roszman | A01C 7/046 |
| 2020/0367426 A1* | 11/2020 | Wilhelmi | A01C 7/046 |

FOREIGN PATENT DOCUMENTS

| | | |
|---|---|---|
| EP | 0106299 A1 * | 4/1984 |
| WO | 2007024646 | 3/2007 |
| WO | 2014066157 | 5/2014 |
| WO | 2014066168 | 5/2014 |
| WO | 2016/055852 | 4/2016 |

OTHER PUBLICATIONS

Nodet Groupe Kuhn, Instructions for Use, 50 pages—1995.
Nodet Groupe Kuhn, Catalogue Pieces De Rechange, Semoir de precision Minigraines 200, 88 pages, 1995.

* cited by examiner

SEEDS DISTRIBUTION DEVICE FOR PRECISION SOWING MACHINES AND PRECISION SOWING MACHINE COMPRISING SUCH A DEVICE

CROSS REFERENCE TO RELATED APPLICATIONS

This application is a U.S. National Phase filing of International Patent Application No. PCT/IB2018/058814 filed on Nov. 9, 2018, which claims the priority of Italian Patent Application No. 102017000128649 filed on Nov. 10, 2017. The disclosures of these applications are hereby incorporated by reference in their entirety.

DESCRIPTION

Technical Field

The invention relates to a seed distribution device for precision sowing machines and a precision sowing machine comprising such a device.

Technological Background

The precision of sowing is a crucial prerequisite in the field of agriculture because the yield of product at harvest depends substantially on the density of the plants per unit of surface-area sowed. In particular, the density of sowing in turn depends on the careful compliance with the sowing spacing. In fact, this measure is a function both of the construction precision characteristics of the sowing machine and of the speed of sowing. Naturally, in order to ensure good productivity of the harvest, it is necessary for the speed of the sowing to be maximized so as to allow the operator to sow large surface-areas quickly.

The best results in maximizing the speed and precision of sowing are obtained with pneumatic sowing machines which typically convey the seed to the ground using pneumatic apparatuses which produce a positive or negative pressure inside a chamber in order to engage the seeds individually with the holes of a sowing disc.

A typical problem relating to the use of these seed selectors with perforated discs is the elimination duplicates of seeds or failures which can compromise the sowing regularity. In order to prevent failures, it is, necessary to make the processing of the seeds on the sowing disc effective but this is at the expense of the presence of duplicates of seeds which are both processed by a single hole.

To this end, there are used in association with the sowing discs devices for separating the seeds which remove duplicate seeds which are processed by the same hole.

German Patent Document No. DE 102013100118 discloses a seed distribution device for a precision seeder comprising a sowing disc that rotates in a direction of rotation and has at least two rows of sowing holes with the sowing holes arranged concentrically to the sowing disc.

International Published Patent Application No. WO 2016/0552 describes a single seed dispenser for a precision automatic sower.

U.S. Pat. No. 3,608,787 is addressed to a device for eliminating double seeds or seed clusters in a distributor for sowing machines.

U.S. Patent Application Publication No. 2016/0255768 discloses an agricultural seeding apparatus and in particular the mounting of a doubles eliminator within a seed meter. The document describes a sowing unit which has a double-abutment separator which collaborates with a distributor disc so as to reduce the tolerance between the disc and the double abutment and thereby to reduce the excessive seeds.

However, this product is not suitable for providing a system for eliminating duplicates of seeds received in the distributor disc which acts in an effective manner with different types of seeds.

In fact, the double-abutment separation is configured to be able to operate in an effective manner only for a specific type of seeds having specific dimensions (greater or smaller), configurations (elongate, elliptical, rounded, etc.) and/or other characteristics (higher or density, etc.) which require specific positions of the abutments with respect to the trajectory followed by seeds conveyed in the holes of the distributor disc.

Therefore, it is evident that by changing the type of seed it becomes necessary to replace the elimination members, thereby losing a substantial quantity of time during these operations.

SUMMARY OF THE INVENTION

An object of the present invention is to provide a seed distribution device and a precision sowing machine comprising such a device which overcome at least one of the disadvantages of the prior art identified.

Within this object, an objective of the invention is to produce a seed distribution device which eliminates the duplicates of seeds which are accidentally positioned on a seed selector disc in an effective manner and which is simply adjustable in order to be adapted to different types and forms of seeds.

According to an embodiment of the present invention, a seed distribution device for precision sowing machines comprises a housing for a seed selector disc which is mounted for rotation about a central rotation axis, at least one ring of holes in the seed selector disc which is provided to transport seeds over a circular trajectory.

Preferably, the seed distribution device for precision sowing machines comprises a first singulator comprising first engagement elements which collaborate with an engagement mechanism of the housing so as to allow adjustment of the position of the first singulator with respect to the circular trajectory of the seeds.

In this manner, there is defined a disruptive selection path for a seed of the transported seeds which is preferably located between the first singulator and the circular trajectory of the seed in which a profile of the first singulator interferes with the circular trajectory overcoming any duplicates of seeds and further centering the desired seed in the transport hole or cell of the seed selector disc. Therefore, it is possible through the first engagement elements to move the first singulator with respect to the circular trajectory so as to be able to modify the disruptive selection path of the seed in accordance with the specific characteristics of the seed being used.

Advantageously, the first singulator comprises first engagement elements which interact with the engagement mechanism of, the housing so as to allow adjustment of the position of the first singulator with respect to the circular trajectory of the seeds. Preferably, the first engagement elements are a through-hole and a through-slot.

According to an embodiment, the first singulator comprises a through-hole and a through-slot, wherein the through-hole is engaged with permitted rotation on a first pin, the first pin being fixedly secured to an eccentric element which is secured with permitted rotation to the housing, the through-slot being engaged on a second pin of the housing and the through-slot being formed so as to allow a rotational-translational movement of the first singulator with respect to the central trajectory.

In this context, the term "rotational-translational" is intended to refer to a complex movement of the first singulator which is composed, at least over a portion thereof, of a rotational movement and a translational movement.

Advantageously, the translational movement is obtained by a sum of translation movements parallel with radial and tangential components of the seed selector disc.

It is thereby possible to move the first singulator towards or away from the central trajectory in a translational manner, affording the advantage of maintaining an orientation of the first singulator which is more parallel with the central trajectory at the various distances from the central trajectory itself with respect to movements which are only rotational about a rotation axis which move away from the central trajectory to a greater extent the portions of the first singulator which are further away from the above-mentioned rotation axis.

Preferably, by varying the orientation of the through-slot with respect to the radius of the seed selector disc passing through the second pin, it is possible to define the inclination at which the first singulator interacts with the region near the central trajectory, thereby defining the intensity and the distribution of the impact forces transferred to the seed, or to the duplicate seeds if present, when transported along the circular trajectory.

In this context, there are defined as "aggressive" conditions the conditions of interaction between a singulator and the central trajectory which tend to develop impact forces greater than other interaction forces which are produced between the transported seed (by the seed selector disc) and portions of the above-mentioned singulator.

According to an embodiment, the seed distribution device for precision sowing machines comprises a housing for a seed selector disc which is mounted for rotation about a central rotation axis, at least one ring of holes in the seed selector disc which is provided to transport seeds over a circular trajectory, a first simulator and a second simulator which are mounted so as to be radially facing on a housing at opposite sides of the circular trajectory of the seeds and being distal and proximal with respect to the central rotation axis.

Advantageously, the first simulator and second simulator are preferably configured so as to both act on at least a portion of the circular trajectory of the seeds, defining a disruptive selection path for the seeds.

It may be noted that the characteristics described above for the first simulator in relation to the technical solution of using a single singulator can be replicated and used for the first singulator and/or the second singulator which is/are used in the other embodiments relating to the present invention.

Preferably, the first singulator and/or the second singulator can be independently and selectively adjusted to modify at least locally the disruptive path so as to eliminate duplicates of seeds from the disc without creating failures.

It is thereby possible to selectively move the two singulators independently, thereby creating disruptive selection paths which involve a seed which is transported along the circular trajectory and which are specifically imposed for the type of seed desired.

As a result of these solutions, the first singulator and the second singulator move towards each other in relative terms, interacting, at a distal and proximal side with a seed which passes along the circular trajectory, respectively, allowing there to be a single seed for each hole of the ring of holes, advantageously eliminating duplicates and possible failures.

Further advantageously, it is possible by this technical solution to define the disruptive selection path for the seed as the space between the first and the second singulators, through which the seeds retained on the seed selector disc pass, producing a selection at opposite sides with respect to the central trajectory.

Advantageously, the first singulator comprises a through-hole and a through-slot, the through-hole being engaged for rotation on the second pin, the through-slot being engaged for rotation on the first pin which is fixedly secured to an eccentric element which is rotatably secured to the housing and the through-slot being formed so as to allow the first singulator to move along a circumferential arc which is centered in the through-hole by rotation of the eccentric element.

In so doing, it is possible to adjust by simple rotation the first singulator by modifying the distance between the first singulator and the second singulator and thereby modifying the spatial development of the disruptive selection path by further increasing the movement of an end of the first singulator which is placed further away from the rotation axis passing through the above-mentioned through-hole, thereby making the selection more effective, for example, for seeds which are attached to the seed selector disc in a manner which is initially weaker.

According to an embodiment, the first singulator comprises a through-hole and a through-slot. Furthermore, the through-hole is engaged rotatably on the first pin, the first pin being fixedly secured to an eccentric element which is rotatably secured to the housing, the through-slot being engaged on the second pin and the through-slot being formed so as to allow the first singulator rotational-translational movement with respect to the second singulator during rotation of the eccentric element.

It is thereby possible to move the first singulator towards or away from the central trajectory and the second singulator in an at least partially translational manner, affording the advantage of maintaining an orientation of the first singulator which is more parallel with the central trajectory at the various distances from the central trajectory and the second singulator.

According to another embodiment, the first singulator is secured in a rigid manner with respect to the housing and only the second singulator is made removable with respect to the housing.

Preferably, the through-slot has a rectangular form with the vertices being rounded and a spacing "L" between the two long sides and the pin on which the through-slot engages has a substantially cylindrical form having a diameter smaller than the spacing between the two long sides.

In this manner, the slot can rotate and/or move in translation on the above-mentioned cylindrical pin, thereby creating complex movements, including rotational-translational movements, of the singulator involved.

According to an embodiment, the through-slot comprises a main longitudinal axis which is inclined by an angle between 90° and 115° with respect to the extension of the radius of the seed selector disc passing through the location of the through-slot which is most proximal to the central rotation axis. Advantageously, this angle is 100°.

In this manner, it is possible to determine how aggressive the singulator comprising the through-slot is with regard to the central trajectory of the seed, determining in each case the force with which to allow the singulator to strike the seed which is retained on the seed selector disc.

Preferably, the first singulator and the second singulator are substantially plate-like and co-planar relative to each other.

This configuration minimizes hindrances, optimizing the efficiency of the singulator(s) and thereby increasing the operating precision of the seed distribution device.

According to an embodiment, the first singulator comprises a first plurality of teeth which project towards the central rotation axis from a first central portion which is circumferentially arcuate.

This technical solution allows the definition of a disruptive selection path with a complex development, being defined by portions which are locally more proximal with respect to the central trajectory (and therefore more aggressive with respect to the seed transported) and portions which are locally further away from the central trajectory (and therefore less aggressive with respect to the seed transported).

Furthermore, the circumferentially arcuate form with respect to the seed selector disc of the central portion allows the above-mentioned disruptive selection path to be followed and modified in an optimum manner with respect to the central trajectory.

Preferably, the first plurality of teeth comprise at least one tooth having a substantially saw-tooth-like form.

It is possible by this technical solution to determine effectively how aggressive the tooth has to be with respect to the seed which is passing through and a surrounding region thereof which extends freely. This further allows a definition of the impact force on the seed transported and any duplicate seeds which are present, thereby making the elimination thereof easier.

According to an embodiment, each tooth of the first plurality of teeth has a profile which gradually becomes more proximal with respect to the circular trajectory travelled by the seed as a function of the direction of rotation of the seed selector disc.

In this manner, it is possible to determine a sequential nature of simulator portions which are gradually more aggressive with respect to the seed transported.

In fact, it is advantageous to emphasize that the seed tends to be secured with less force at the start of the removal action and abuts the surface of the seed selector disc and that this retention force, at least for a predetermined sector, gradually increases as the seed moves along the circular trajectory in accordance with the direction of rotation of the seed selector disc.

It thereby appears to be advantageous, for example, to provide for teeth having increasingly great aggressiveness as a function of the position of the seed over the trajectory so as to optimize the relationship between the impact force acting and the retention force operating on the seed, further improving the efficiency of the seed distribution device.

Preferably, the first plurality of teeth comprise three teeth which are spaced apart from each other by a first pitch and which are spaced apart by two recesses of the first singulator.

In this mariner, there is produced a type of disruptive selection path which is partially sinusoidal between the first singulator and the central trajectory and/or the second singulator which better allows the periodic alternation between zones which are aggressive to a greater or smaller extent and therefore a better selection of the single seed desired at the same time as a better centering of the seed with respect to the corresponding hole of the seed selector disc.

It is important to note that better centering of the seed on the cell of the seed selector disc allows a more centered final release of the seed into the ground and therefore a more precise and efficient sowing operation.

According to an embodiment, the second singulator comprises at least a second tooth, preferably at least two teeth, which project(s) from a second main arcuate portion of the second singulator and which face(s) the first singulator.

In this case, therefore, it also becomes possible to define an additional disruptive selection path with a complex development, being defined by portions of the second singulator which are locally more proximal with respect to the central trajectory (and therefore more aggressive with respect to the seed transported) and portions which are locally further away from the central trajectory (and therefore less aggressive with respect to the seed transported).

Preferably, the second plurality of teeth comprise two teeth.

According to an embodiment, the three teeth of the first plurality of teeth and the two teeth of the second plurality of teeth are arranged in a co-planar and alternating manner relative to each other so that each of the two teeth of the second plurality of teeth faces one of the two recesses of the first singulator, thereby defining an adjustable disruptive selection path which has a sinusoidal development between the first plurality of teeth and the second plurality of teeth.

In this manner, it is possible to define an optimum sinusoidal disruptive path which allows local application of more and less aggressive zones to the seed which is retained in a periodically alternating manner both by the first singulator and by the second singulator, maintaining a total section of the disruptive selection path which is substantially constant as a function of the circular trajectory, in the embodiments previously described, the first singulator is removable while the second singulator is fixed. This technical solution may be considered simply by way of a non-limiting example and the present invention actually includes the embodiments in which the first singulator is fixed and the second singulator is removable or both the singulators are independently removable.

The present invention relates to a precision sowing machine comprising a seed distribution device which is constructed according to the characteristics described above.

It is to be understood that both the foregoing general description and the following detailed description are exemplary, but are not restrictive, of the disclosure.

DESCRIPTION OF THE DRAWINGS

The features and advantages of the invention will be better appreciated from the detailed description of embodiments thereof which are illustrated by way of non-limiting example with reference to the appended drawings, in which.

DETAILED DESCRIPTION OF EMBODIMENTS

Figure 1:
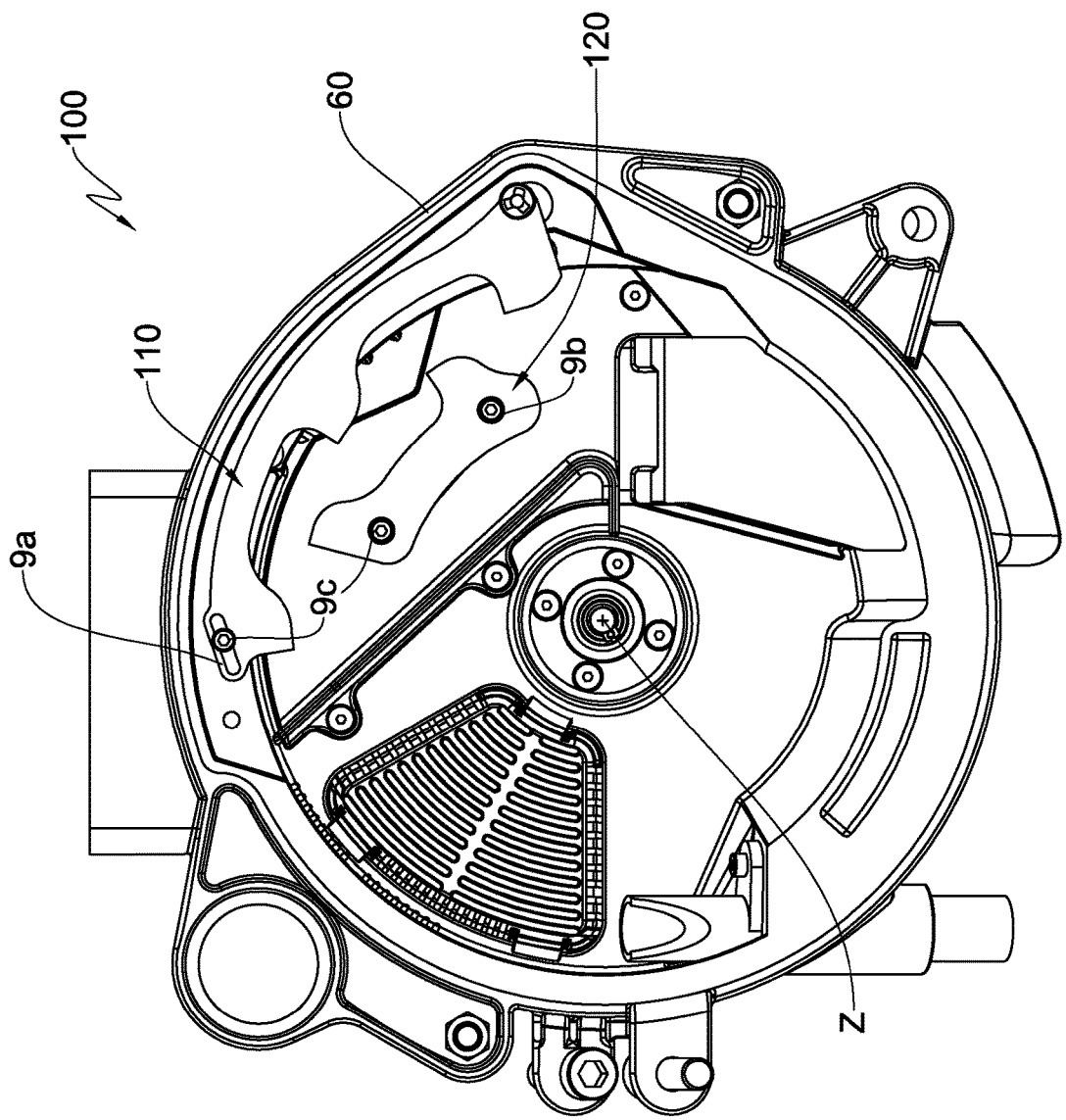
FIG. 1 is a front view of a seed distribution device constructed according to the present invention.

In the Figures, the reference numbers 1, 100 designate a seed distribution device for a precision sowing device.

Preferably, the seed distribution device 1, 100 for a precision sowing device comprises a housing 60 for a seed selector disc which is mounted for rotation about a central rotation axis Z, at least one ring of holes on the seed selector disc provided to transport seeds S, over a circular trajectory C, a first singulator 10, 110 and a second singulator 20, 120 which are mounted radially facing the housing 60 at opposite sides of the circular trajectory C of the seeds S and Which are distal and proximal with respect to the central rotation axis Z, respectively.

Figure 2:
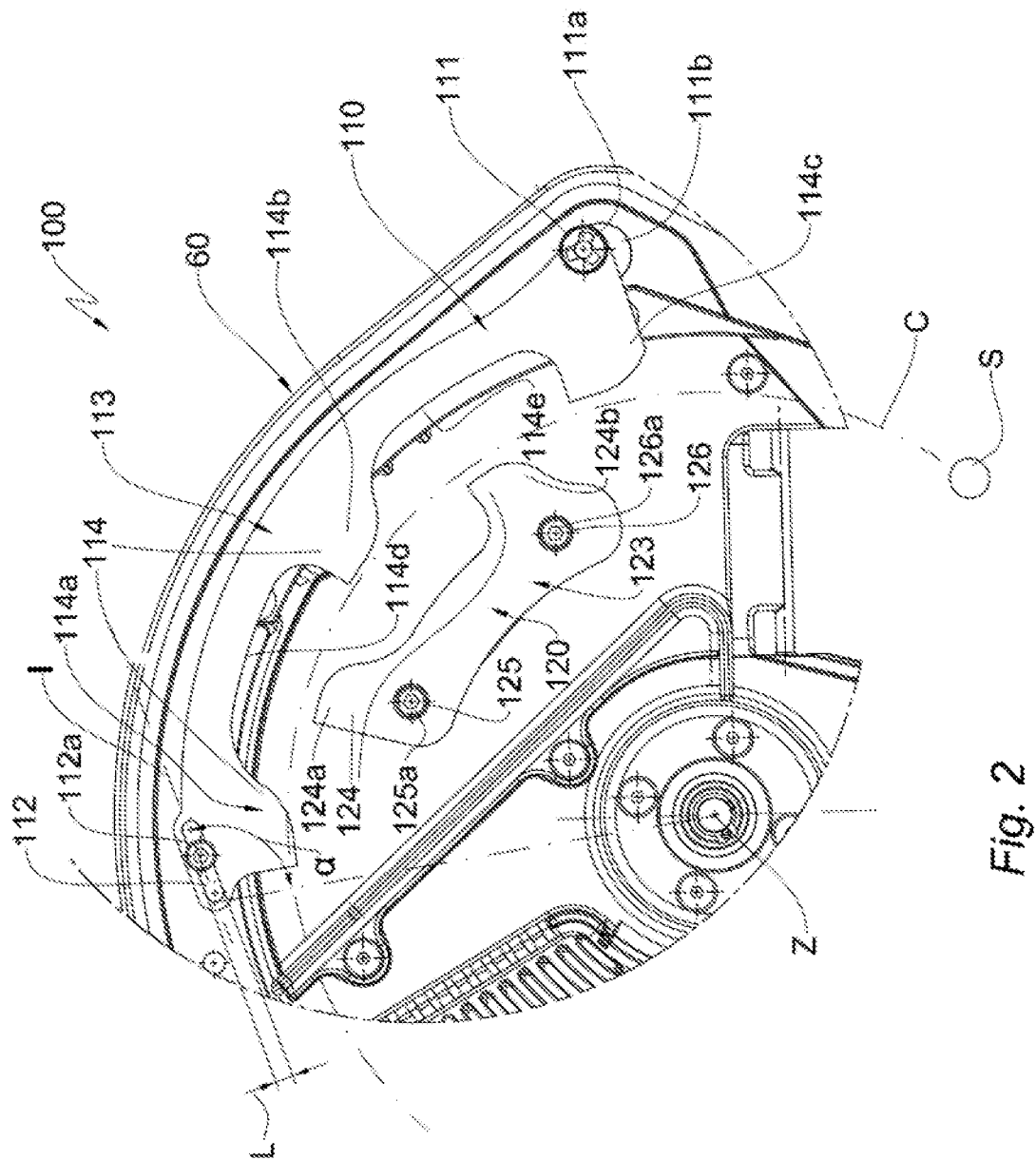
FIG. 2 is a front view, to an enlarged scale, of singulators of the seed distribution device of FIG. 1.

FIG. 2 shows an example of the circular trajectory C illustrated with broken lines.

Advantageously, the first singulator 10, 110 and the second singulator 20, 120 are configured, that is to say, arranged, so as to both act on at least a portion of the circular trajectory C of the seeds S, defining a disruptive selection path for the seeds S.

The first singulator 10, 110 and the second singulator 20, 120 define a disruptive selection path for the seeds S so that the first singulator 10, 110 and/or the second singulator 20, 120 is/are independently adjustable selectively in order to modify at least locally the disruptive path so as to eliminate duplicates of seeds S by the seed selector disc without creating failures.

The above-mentioned seed selector disc is capable of conveying and transporting the seeds S set down in the above-mentioned cell along the circular trajectory C.

By way of non-limiting example, the circular trajectory C illustrated in FIG. 2 has a laying radius of the holes of the seed selector disc equal to 95 mm and is equivalent (even if not indicated) in all the Figures of the present invention.

According to an embodiment, the first singulator 10, 110 and the second singulator 20, 120 comprise first and second engagement elements 9a, 9b, respectively, which are arranged to interact with an engagement mechanism 9c of the housing 60 so as to allow the above-mentioned independent selective adjustment of the first singulator 10, 110 and/or second singulator 20, 120 in order to modify at least locally the disruptive selection path.

Preferably, the above-mentioned first and second engagement elements 9a, 9b are elements of the mechanical type (for example, holes, slots, etc.), magnetic type (permanent magnets, electromagnets, etc.), or the like, and the engagement mechanism 9c is of the mechanical type (for example, pins, teeth, etc.), magnetic type (permanent magnets, electromagnets, etc.), or the like.

Figure 3:
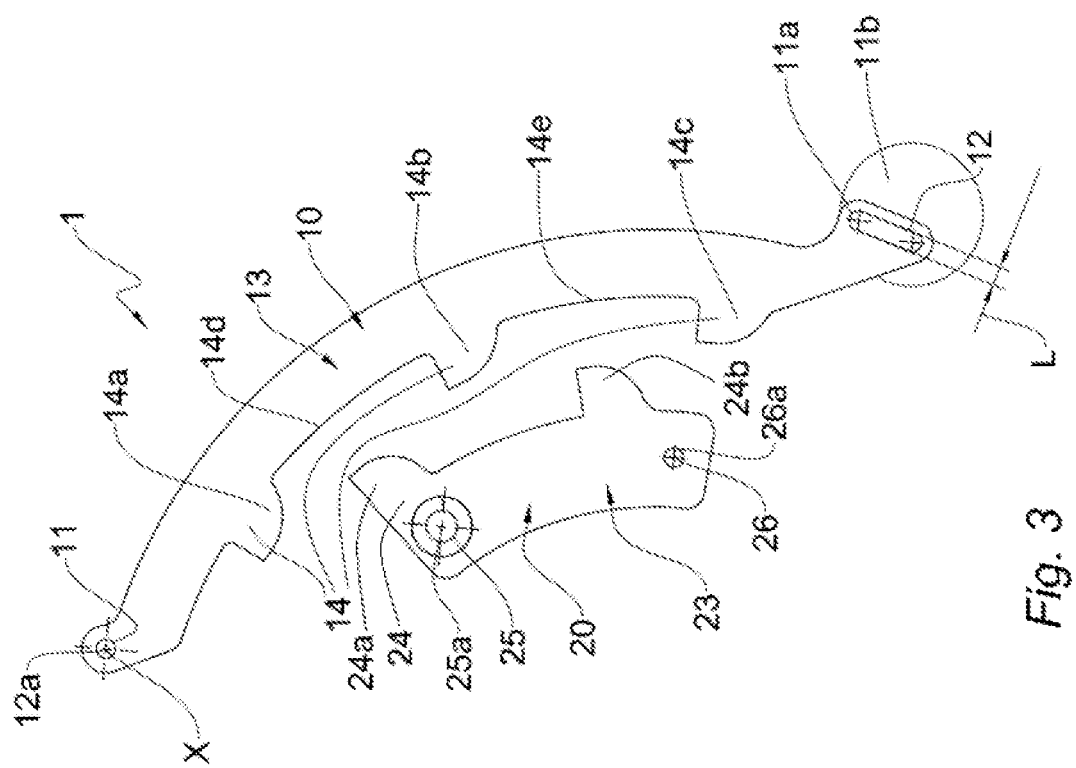
FIG. 3 is a front view, to an enlarged scale, of another embodiment of singulators of the seed distribution device of FIG. 1.

With reference to FIG. 3, the first singulator 10 preferably comprises a through-hole 11 and a through-slot 12, the through-hole 11 being engaged rotatably on a second pin 12a so that the first singulator 10 can rotate about the axis X, the through-slot 12 being engaged rotatably on a first pin 11a which is fixedly secured to an eccentric element 11b, this eccentric element 11b being rotatably secured to the housing 60. Furthermore, the through-slot 12 is formed so as to allow the first singulator 10 to move along a centered circumferential arc in the through-hole 11 dining rotation of the eccentric element 11b.

Figure 5C:
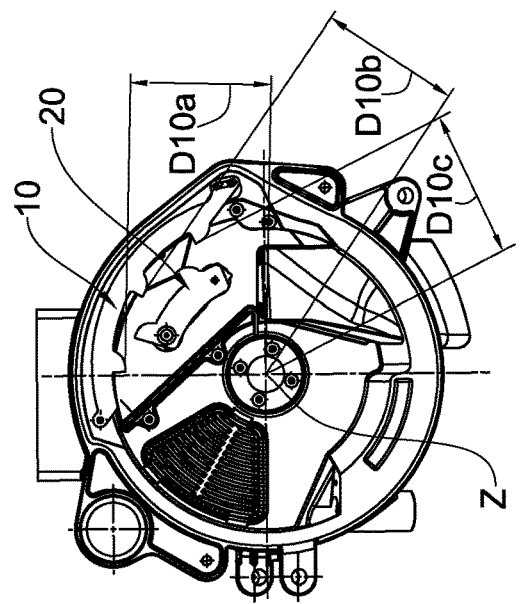
FIGS. 5a, 5b, and 5c are front views of different configurations of use of the device of FIG. 1 when the singulators of FIG. 3 are installed.
Figure 5B:
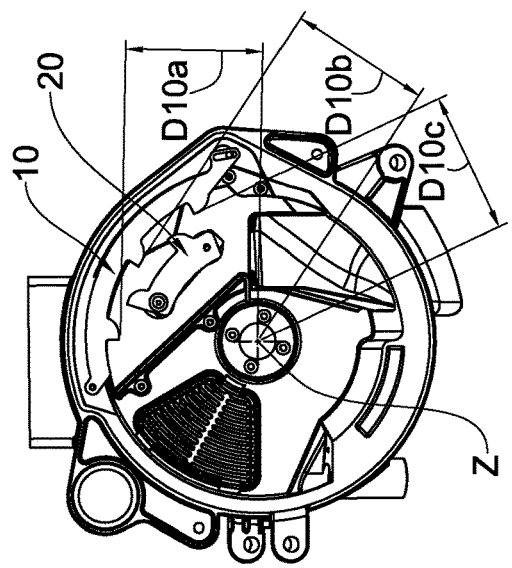
Figure 5A:
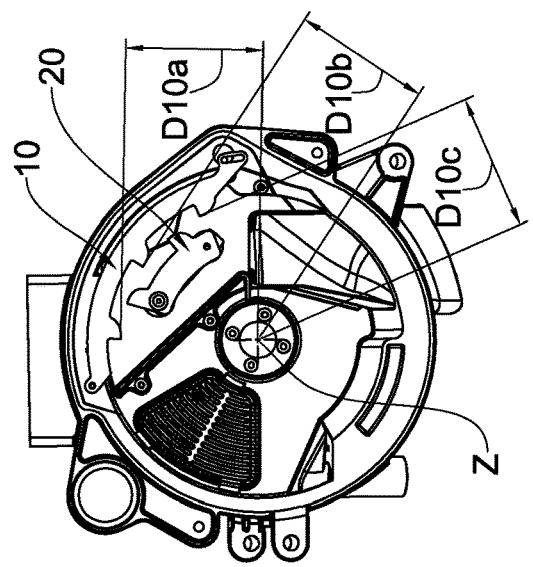

With reference to FIGS. 5a, 5b, and 5c, there are shown three configurations in which the first singulator 10 and the central rotation axis Z are at a minimum, mean, and maximum mutual distance, respectively.

According to another embodiment, the first singulator 110 comprises a through-hole 111 and a through-slot 112 in which the through-hole 111 with permitted rotation on a first pin 111a, the first pin 111a being fixedly secured to an eccentric element 111b which is rotatably secured to the housing 60, the through-slot 112 being engaged with a second pin 112a and the through-slot 112 being formed so as to allow a rotational-translational movement of the first singulator 110 with respect to the second singulator 120 during rotation of the eccentric element 111b.

Advantageously, the first singulator 10, 110 and the second singulator 20, 120 are produced from materials having high levels of modulus of elasticity and hardness, such as, for example, steel, anodized aluminum, materials sintered so as to ensure good resistance to wear, etc. Furthermore, the above-mentioned through-hole 11, 111 and through-slot 12, 112 are preferably produced by molding or casting or drilling or milling processing or similar industrial techniques.

According to an embodiment, the housing is produced from aluminum.

Preferably, with reference to FIGS. 2 and 3, the through-slot 12, 112 has a rectangular form with the vertices being rounded and a spacing L between the two long sides and the pin 11a, 112a on which the through-slot 12, 112 engages has a substantially cylindrical form having a diameter smaller than the spacing L.

According to an embodiment shown in FIG. 2, the through-slot 12, 112 comprises a main longitudinal axis I which is inclined by an angle $\alpha$ between 90° and 115° with respect to the extension of the radius of the seed selector disc passing through the location of the through-slot 12, 112 which is most proximal to the central rotation axis Z. Advantageously, this angle $\alpha$ is equal to 100°.

Preferably, the first singulator 10, 110 and the second singulator 20, 120 are substantially plate-like and co-planar relative to each other.

Advantageously, the first singulator 10, 110 and the second singulator 20, 120 have a thickness between 2 mm and 3 mm and a linear extent between 60 mm and 180 mm.

According to an embodiment, the first singulator 10, 110 comprises at least one tooth, preferably at least two teeth, and possibly a plurality of teeth 14, 114 which project(s) towards the central rotation axis Z from a first central portion 13, 113 which is circumferentially arcuate.

With reference to FIGS. 2 and 3, the first central portion 13, 113 is an annular or toroidal sector which extends circumferentially in accordance with a preferred radius of curvature. Advantageously, this radius of curvature is greater than or equal to the radius of curvature of the circular trajectory C.

Preferably, the first plurality of teeth 14, 114 comprise at least one tooth 14a, 114a which has a substantially saw-tooth-like form.

Advantageously, the connection points between the first central portion 13, 113 and the saw tooth 14a, 114a define inflection points between changes of concavity of the first central portion 13, 113 and a portion of the saw tooth 14a, 114a which is distal from the first central portion 13, 113 itself.

In this manner, it is possible to have a profile of the tooth which engages with the seed S in a selectively gradual manner, increasing the possibility of removing the excess seeds and correctly centering the desired seed in the predetermined cell.

According to an embodiment, each tooth of the first plurality of teeth 14, 114 has a profile which is increasingly proximal with respect to the circular trajectory C travelled by the seed S as a function of the direction of rotation of the seed selector disc.

Advantageously, the difference between the distances of the teeth 14, 114 which can be measured by the distal or local portion thereof with respect to the central rotation axis Z is more or less, from 0 to 15% of the mean of the distances of the teeth 14, 114 themselves.

Preferably, the first plurality of teeth 14, 114 comprise three teeth 14a, 14b, 14c, 114a, 114b, 114c which are spaced apart from each other by a first pitch P1 and which are spaced apart by two recesses 14d, 14e, 114d, 114e of the first singulator 10, 110. With reference to FIGS. 4a, 4b, 4c and 5a, 5b, 5c, it is clearly evident that the same portions of the above-mentioned first singulator 10 are located with minimum, mean, and maximum spacings with respect to the central rotation axis Z as a function of the angles of rotation applied to the eccentric element 111b, 111b.

Figures 4A, 4B, 4C:
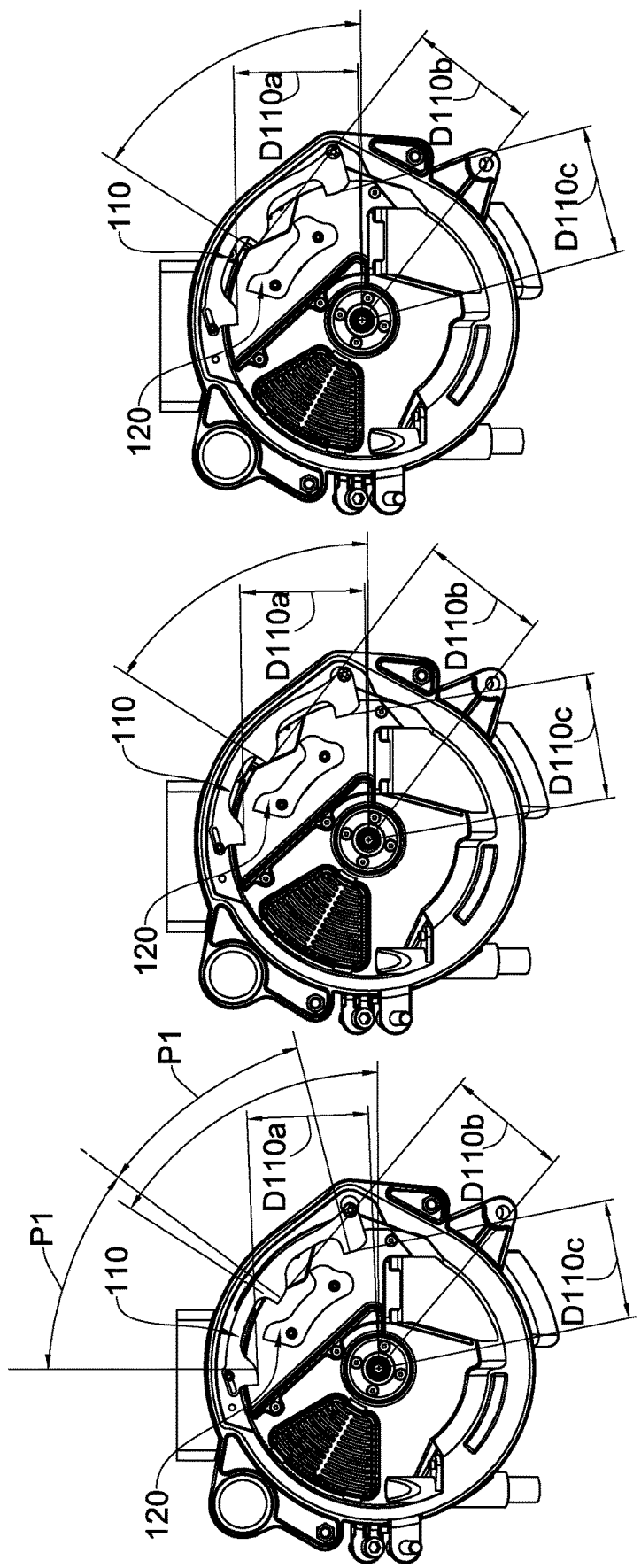
FIGS. 4a, 4b, and 4c are front views of different configurations of use of the device of FIG. 1.

In order to provide a more comprehensive description and with reference to FIGS. 4a, 4b, 4c, there are defined three distances from the central rotation axis Z of a first, second, and third tooth D110a, D110b, D110c, respectively. By way of non-limiting example, reference may be made below to a Table (Table 1) which indicates the above-mentioned values as a function of the configuration of the first singulator 10, 110 with minimum, mean, and maximum spacings with respect to the central rotation axis Z.

TABLE 1

| Distance | Minimum configuration | Mean configuration | Maximum configuration |
|---|---|---|---|
| D110a | 94.95 | 97.34 | 97.34 |
| D110b | 94 | 98.93 | 100.75 |
| D110c | 93.53 | 98.63 | 101.52 |

Similarly, in order to provide a more comprehensive description and with reference to FIGS. 5a, 5b, 5c, there are defined three distances from the central rotation axis Z of a first, second, and third tooth D10a, D10b, D10c, respectively, in relation to another embodiment of the present invention. By way of non-limiting example, reference may be made below to a Table (Table 2) Which indicates the above-mentioned values as a function of the configuration of the first singulator 10, 110 with minimum, mean, and maximum spacings with respect to the central rotation axis Z.

TABLE 2

| Distance | Minimum configuration | Mean configuration | Maximum configuration |
|---|---|---|---|
| D11a | 94.7 | 95.8 | 97 |
| D11b | 94.2 | 97.2 | 100.4 |
| D11c | 94 | 97.9 | 102 |

It can readily be seen (in particular in the configuration with maximum spacing) by comparing the data contained in Table 1 and in Table 2 how the embodiment of FIG. 2 allows a spacing to be maintained with respect to the central rotation axis Z which is more uniform between the various teeth.

According to an embodiment, the second singulator 20, 120 comprises a second plurality of teeth 24, 124 which project from a second central portion 23, 123 of the second singulator 20, 120 and which face the first singulator 10, 110.

With reference to FIGS. 2 and 3, the second central portion 23, 123 is an annular or toroidal sector which extends circumferentially in accordance with a preferred radius of curvature. Advantageously, this radius of curvature is smaller than or equal to the radius of curvature of the central trajectory C. As illustrated, the second singulator 20, 120 comprises a first opening 25, 125 and a second opening 26, 126. The first opening 25, 125 engages a first post 25a, 125a and the second opening 26, 126 engages a second post 26a, 126a to fix the second singulator 20, 120 in position.

Preferably, the second plurality of teeth 24, 124 comprise at least one tooth 24a, 124a which has a substantially saw-tooth-like form.

Advantageously, the connection points between the second central portion 23, 123 and the saw tooth 24a, 124a define inflection points between changes of concavity of the second central portion 23, 123 and a portion of the saw tooth 24a, 124a which is distal from the second central portion 23, 123 itself.

In this manner, it is possible to have a profile of the tooth which engages with the seed S in a selectively gradual manner by increasing the possibility of removing the excess seeds and correctly centering the desired seed in the predetermined cell.

According to an embodiment, each tooth of the second plurality of teeth 24, 124 has a profile which becomes increasingly more proximal to the circular trajectory C which is travelled by the seed S as a function of the direction of rotation of the seed selector disc.

Advantageously, the difference between the distance of the teeth 24, 124 which are measurable by the distal or local portion thereof with respect to the central axis of rotation Z is between more or less 0 and 15% of the mean of the distances of the teeth 24, 124.

Preferably, the second plurality of teeth 24, 124 comprise two teeth 24a, 24b, 124a, 124b.

Advantageously, the two teeth 24a, 24b, 124a, 124b of the second plurality of teeth 24, 124 are positioned at the distal ends of the second central portion 23, 123, respectively.

According to an embodiment and with reference to FIGS. 1, 2, and 3, the three teeth 14a, 14b, 14c, 114a, 114b, 114c of the first plurality of teeth 14, 114 and the two teeth 24a, 24b, 124a, 124b of the second plurality of teeth 24, 124 are arranged in a co-planar and alternating manner relative to each other so that each of the two teeth 24a, 24b, 124a, 124b of the second plurality of teeth 24, 124 faces one of the two recesses 14d, 14e, 14d, 14e of the first singulator 10, 110, thereby defining a disruptive selection path which can be adjusted with a sinusoidal development between the first plurality of teeth 14, 114 and the second plurality of teeth 14, 124.

In the embodiments described above, the first singulator 10, 110 can be moved while the second singulator 20, 120 is fixed. This technical solution may be considered simply by way of non-limiting example and in fact the present invention includes the embodiments in which the first singulator 10, 110 is fixed and the second singulator 20, 120 is movable or both the separators can be moved independently.

The present invention relates to a precision seeding device comprising a seeds distribution device 1, 100 which is constructed according to the characteristics described above.

Although illustrated and described above with reference to certain specific, embodiments, the present disclosure is nevertheless not intended to be limited to the details shown. Rather, various modifications may be made in the details within the scope and range of equivalents of the claims and without departing from the spirit of the disclosure.

The invention claimed is:

1. A seed distribution device for precision sowing machines comprising:
   a housing for a seed selector disc which is mounted for rotation about a central rotation axis and which has at least one ring of holes provided to transport seeds over a circular trajectory having opposite sides;

a first singulator mounted at a first location on the housing and a second singulator mounted at a separate, independent location on the housing so as to be radially facing each other at the opposite sides of the circular trajectory and so as to be distal and proximal with respect to the central rotation axis, respectively, the first singulator and the second singulator being configured so as to both act on at least a portion of the circular trajectory, defining a disruptive selection path for the seeds, wherein the first singulator is adjustable relative to the second singulator in a selective and independent manner to modify at least locally the disruptive selection path so as to eliminate duplicates of seeds from the disc without creating failures; and an eccentric element rotatably secured to the housing and to which is fixedly secured a first pin, the first pin being eccentric with respect to the rotation axis of the eccentric element, wherein the housing has a second pin and the first singulator comprises a through-hole and a through-slot, the through-hole being engaged rotatably on the second pin and the through-slot being engaged on the first pin and configured to allow the first pin to translate along the through-slot and the first singulator to move along a circumferential arc which is centered on the through-hole during rotation of the eccentric element, wherein the eccentric element is located before the second pin with respect to the circular trajectory travelled by the seed as a function of the direction of rotation of the seed selector disc, wherein the first singulator comprises a first plurality of teeth and the second singulator comprises a second plurality of teeth, wherein the second singulator is mounted on the housing through posts that prevent radial and circumferential movement of the second singulator relative to the housing and the first singulator, the first singulator being movable along the circumferential arc so as to modify both the radial and the circumferential distance between the first plurality of teeth and the second plurality of teeth.

2. The seed distribution device according to claim 1, wherein the first singulator and the second singulator are substantially plate-like and co-planar relative to each other.

3. The seed distribution device according to claim 1, wherein the first plurality of teeth of the first singulator project towards the central rotation axis.

4. The seed distribution device according to claim 3, wherein at least one tooth of the first plurality of teeth has a profile which gradually becomes more proximal with respect to the circular trajectory which is travelled by the seed as a function of the direction of rotation of the seed selector disc.

5. The seed distribution device according to claim 3, wherein the first plurality of teeth of the first singulator comprises three teeth which are spaced apart from each other by a first pitch and which are spaced apart by two recesses.

6. The seed distribution device according to claim 1, wherein the second singulator comprises a main portion and at least one tooth of the second plurality of teeth projects from the main portion and which faces the first singulator.

7. The seed distribution device according to claim 1, wherein at least one first tooth of the first plurality of teeth of the first singulator and at least one second tooth of the second singulator are positioned angularly around the central rotation axis, wherein the disruptive selection path is defined by the at least one first and second teeth in an annular portion between the first singulator and the second singulator.

8. The seed distribution device according to claim 1, wherein the first singulator comprises three teeth separated by two recesses and the second singulator comprises at least two teeth, wherein the three teeth of the first singulator and the two teeth of the second singulator are arranged in a co-planar and alternating manner relative to each other so that each of the two teeth of the second singulator faces one of the two recesses of the first singulator, thereby defining the disruptive selection path so that the disruptive selection path is sinusoidal between the first singulator and the second singulator.

9. The seed distribution device according to claim 1, wherein the second singulator is positioned within a circular sector defined between the first pin and the second pin.

10. A precision sowing machine comprising the seed distribution device according to claim 1.

11. The seed distribution device according to claim 1, wherein the through-slot has a rectangular form with rounded vertices, two long sides, and a spacing between the two long sides and the first pin which the through-slot engages has a substantially cylindrical form with a diameter smaller than the spacing.

12. The seed distribution device according to claim 11, wherein the through-slot comprises a main longitudinal axis which is inclined by an angle between 90° and 115° with respect to a radial line extending from the central rotation axis and passing through the location of the through-slot which is most proximal to the central rotation axis.

13. A seed distribution device for precision sowing machines comprising:

a housing for a seed selector disc which is mounted for rotation about a central rotation axis and which has at least one ring of holes provided to transport seeds over a circular trajectory having opposite sides;

a first singulator mounted at a first location on the housing and a second singulator mounted at a separate, independent location on the housing, the first singulator and the second singulator being substantially plate-like and co-planar relative to each other, adjustable relative to each other in a selective and independent manner, and mounted on the housing so as to be radially facing each other at the opposite sides of the circular trajectory and so as to be distal and proximal with respect to the central rotation axis, respectively, the first singulator and the second singulator being configured so as to both act on at least a portion of the circular trajectory, defining a disruptive selection path for the seeds; and an eccentric element rotatably secured to the housing and to which is fixedly secured a first pin, the first pin being eccentric with respect to the rotation axis of the eccentric element, wherein the housing has a second pin and the first singulator comprises a through-hole and a through-slot, the through-hole being engaged rotatably on the second pin and the through-slot being engaged on the first pin and configured to allow the first pin to translate along the through-slot and the first singulator to move along a circumferential arc with respect to the second singulator during rotation of the eccentric element, wherein the eccentric element is located before the second pin with respect to the circular trajectory travelled by the seed as a function of the direction of rotation of the seed selector disc, and wherein the first singulator is adjustable relative to the second singulator to modify at least locally the disruptive selection path so as to eliminate duplicates of seeds from the disc without creating failures,
wherein the first singulator comprises a first plurality of teeth and the second singulator comprises a second plurality of teeth, wherein the second singulator is mounted on the housing through posts that prevent radial and circumferential movement of the second singulator relative to the housing and the first singulator, the first singulator being movable along the circumferential arc so as to modify both the radial and the circumferential distance between the first plurality of teeth and the second plurality of teeth.

14. The seed distribution device according to claim 13, wherein at least one first tooth of the first plurality of teeth of the first singulator and at least one second tooth of the second plurality of teeth of the second singulator are positioned angularly around the central rotation axis, wherein the disruptive selection path is defined by the at least one first and second teeth in an annular portion between the first singulator and the second singulator.

15. The seed distribution device according to claim 13, wherein the first singulator comprises three teeth separated by two recesses and the second singulator comprises at least two teeth, wherein the three teeth of the first singulator and the two teeth of the second singulator are arranged in a co-planar and alternating manner relative to each other so that each of the two teeth of the second singulator faces one of the two recesses of the first singulator, thereby defining the disruptive selection path so that the disruptive selection path is sinusoidal between the first singulator and the second singulator.

16. A precision sowing machine comprising the seed distribution device according to claim 13.

17. A seed distribution device for precision sowing machines comprising:
a housing for a seed selector disc which is mounted for rotation about a central rotation axis and which has at least one ring of holes provided to transport seeds over a circular trajectory having opposite sides; and
a first singulator mounted at a first location on the housing and a second singulator mounted at a separate, independent location on the housing so as to be radially facing each other at the opposite sides of the circular trajectory and so as to be distal and proximal with respect to the central rotation axis, respectively, the first singulator and the second singulator being configured so as to both act on at least a portion of the circular trajectory, defining a disruptive selection path for the seeds,
wherein the first singulator is adjustable relative to the second singulator in a selective and independent manner to modify at least locally the disruptive selection path so as to eliminate duplicates of seeds from the disc without creating failures,
wherein the seed distribution device further comprises an eccentric element rotatably secured to the housing and to which is fixedly secured a first pin, the first pin being eccentric with respect to the rotation axis of the eccentric element, wherein the housing has a second pin and the first singulator comprises a through-hole rotatably engaged with the first pin and a through-slot engaged on the second pin and configured to allow a rotational-translational movement of the first singulator with respect to the second singulator during rotation of the eccentric element, and
wherein the eccentric element is located before the second pin with respect to the circular trajectory travelled by the seed as a function of the direction of rotation of the seed selector disc,
wherein the first singulator comprises a first plurality of teeth and the second singulator comprises a second plurality of teeth, wherein the second singulator is mounted on the housing through posts that prevent radial and circumferential movement of the second singulator relative to the housing and the first singulator, the first singulator being movable along a rotational-translational path so as to modify both the radial and the circumferential distance between the first plurality of teeth and the second plurality of teeth.

18. The seed distribution device according to claim 17, wherein the through-slot has a rectangular form with rounded vertices, two long sides, and a spacing between the two long sides, and the second pin which the through-slot engages has a substantially cylindrical form with a diameter smaller than the spacing.

19. The seed distribution device according to claim 18, wherein the through-slot comprises a main longitudinal axis which is inclined by an angle between 90° and 115° with respect to a radial line extending from the central rotation axis and passing through the location of the through-slot which is most proximal to the central rotation axis.

* * * * *